(12) United States Patent
Matsuoka

(10) Patent No.: US 6,327,029 B1
(45) Date of Patent: Dec. 4, 2001

(54) RANGE FINDING DEVICE OF SCANNING TYPE

(75) Inventor: Katsuji Matsuoka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/399,358

(22) Filed: Sep. 20, 1999

(30) Foreign Application Priority Data

May 28, 1999 (JP) .................................................. 11-149265

(51) Int. Cl.[7] .............................. G01C 3/08; G01B 11/26; B60T 7/16
(52) U.S. Cl. ...................... 356/5.01; 356/141.1; 180/169
(58) Field of Search ............................. 356/141.1, 5.01; 396/106; 180/169

(56) References Cited

U.S. PATENT DOCUMENTS

| | | | |
|---|---|---|---|
| 4,632,543 | * | 12/1986 | Endo . |
| 5,114,226 | * | 5/1992 | Goodwin et al. . |
| 5,682,229 | * | 10/1997 | Wangler ........................... 356/4.01 |
| 5,760,886 | * | 6/1998 | Miyazaki et al. .................. 356/5.01 |
| 6,122,040 | * | 9/2000 | Arita et al. ........................ 356/5.01 |

FOREIGN PATENT DOCUMENTS 7-84045   3/1995   (JP) .

* cited by examiner

*Primary Examiner*—Stephen C. Buczinski

(57) ABSTRACT

A range finding device of scanning type including a laser beam emitting means which emits pulse laser beams from a single light source while changing an emission angle and scanning, and a range finding means for detecting a range from an object from reciprocating times of the pulse laser beams reflected by the object, wherein the scan is conducted by shifting the pulse laser beams for each scan and the amount of shifting the beams is a value obtained by equally dividing an interval of the beams into a plural, whereby the range from the object can be measured at a high rate in many directions with a low cost, and an angular resolution in horizontal directions, an accuracy of relative position and an accuracy of relative velocity of the object are improved, and a time lag in judging a horizontal direction angle of the object can be minimized.

6 Claims, 9 Drawing Sheets

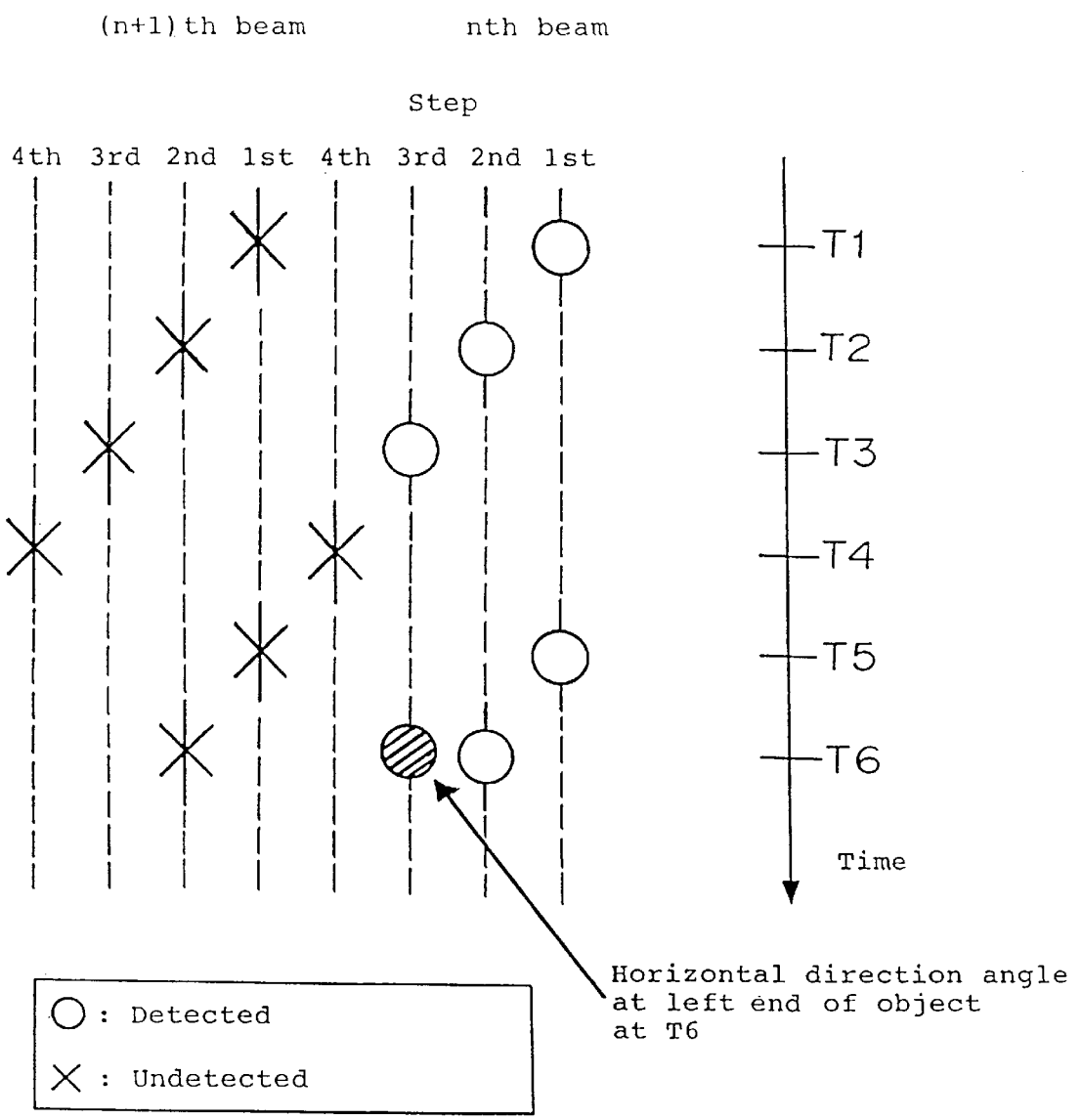

FIG. 9

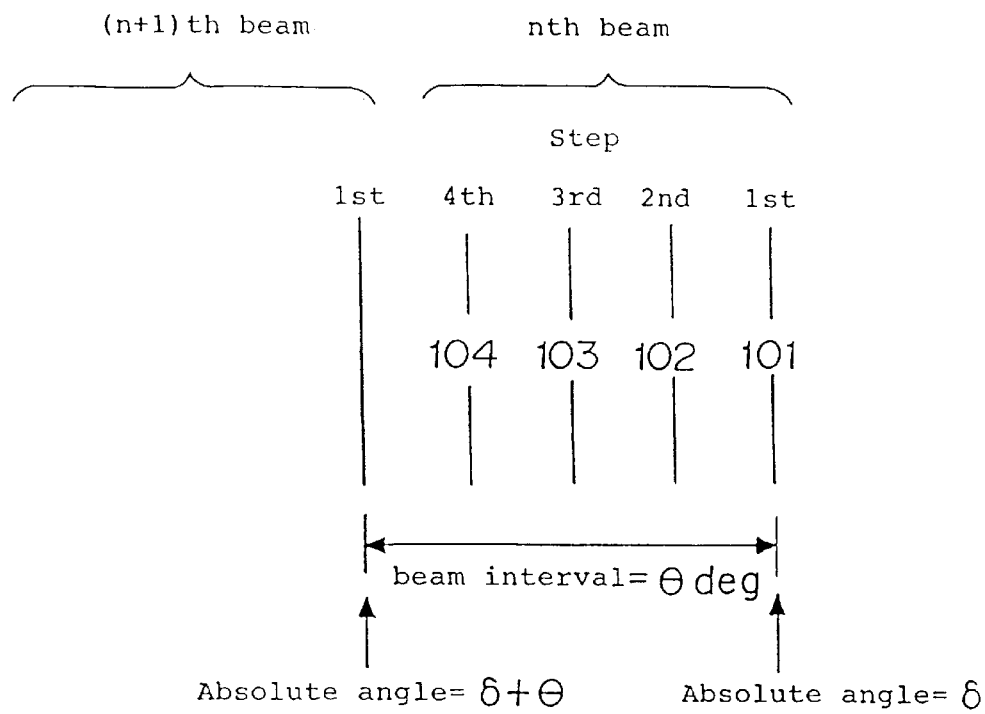

| Information of past 4 times | Current position (horizontal direction angle) |
|---|---|
| Detecting only 1st step | ① ($\delta$) |
| Detecting 1st and 2nd steps | ② ($\delta + \Theta/4$) |
| Detecting 1st, 2nd, and 3rd steps | ③ ($\delta + \Theta/2$) |
| Detecting 1st, 2nd, 3rd, and 4th steps and previous position is 103 | ④ ($\delta + (3/4)\Theta$) |
| Detecting 1st, 2nd, 3rd, and 4th steps and previous position is 102 | ① ($\delta$) |
| Detecting 2nd, 3rd, and 4th steps | ② ($\delta + \Theta/4$) |
| Detecting 3rd and 4th steps | ③ ($\delta + \Theta/2$) |
| Detecting only 4th step | ④ ($\delta + (3/4)\Theta$) |

# RANGE FINDING DEVICE OF SCANNING TYPE

BACKGROUND OF THE INVENTION

1. Field of the Invention

The present invention relates to a range finding device of scanning type used for a system of alerting collisions of a vehicle.

2. Discussion of Background

An example of a conventional range finding device of a scanning type is disclosed in, JP-A-7-84045. In this reference, a range finding device for emitting laser beams in a plurality of directions and receiving reflected light from objects, respectively positioned in emitting directions of the laser beams, in order to respectively measure ranges is disclosed. The device simultaneously scans the plurality of laser beams for measuring the ranges from the objects, respectively positioned in the directions of emitting the laser beams. According to this device, a scanning period is shortened to be one of the number of the plurality of the laser beams and a degree of freedom is increased in designing an optical system.

However, such conventional range finding techniques have problems. For example, a plurality of laser diodes are necessary and thereby the cost is increased.

SUMMARY OF THE INVENTION

It is an object of the present invention to solve the above-mentioned problem inherent in the conventional technique and to provide a range finding device of scanning type which measures ranges in many directions at a high rate and improves the angular resolution with an uncostly structure.

According to a first aspect of the present invention, there is provided a range finding device of a scanning type comprising a means for emitting a laser beam which emits laser beamn pulses from a single light source and scans by changing a heading angle of the emission, and a range finding means for detecting a range from an object in correspondence with a scanning angle based on a reciprocating time between the emission of the pulses from the means for emitting laser beams and a receipt of the pulses reflected by the object, wherein the means for emitting the laser beam shifts the beam scanning angle of emitting the pulses in each scan.

According to a second aspect of the present invention, there is provided the range finding device of scanning type according to the first aspect of the invention, wherein the amount of beam shift of the scanning angle at a time of emitting the pulses by each scan is a value obtained by dividing the beam intervals of the emitting pulses into equal parts.

According to a third aspect of the present invention, there is provided the range finding device of scanning type according to the first or second aspect of the invention, wherein a direction angle of the object is judged based on detected information in a finished plurality of scans corresponding to the scanning angle obtained by the range finding means.

According to a fourth aspect of the present invention, there is provided the range finding device according to the third aspect of the invention, wherein the direction angle of the object is judged based on most recently detected information being the number equal to that of turning the scanning angle at a time of emitting the pulses in correspondence with the scanning angle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanied drawings, wherein:

FIG. 8 is a chart for explaining a method of detecting an object by the range finding device of scanning type illustrated in FIG. 1; and FIG. 9 schematically shows a method of detecting an object by the range finding device illustrated in FIG. 1.

DETAILED DESCRIPTION OF THE PREFERRED EMBODIMENTS

A detailed explanation will be given of preferred embodiments of the present invention in reference to FIG. 1 through 9 as follows, wherein the same numerical references are used for the same or the similar portions and description of these portions is omitted.

EMBODIMENT 1

Figure 1:
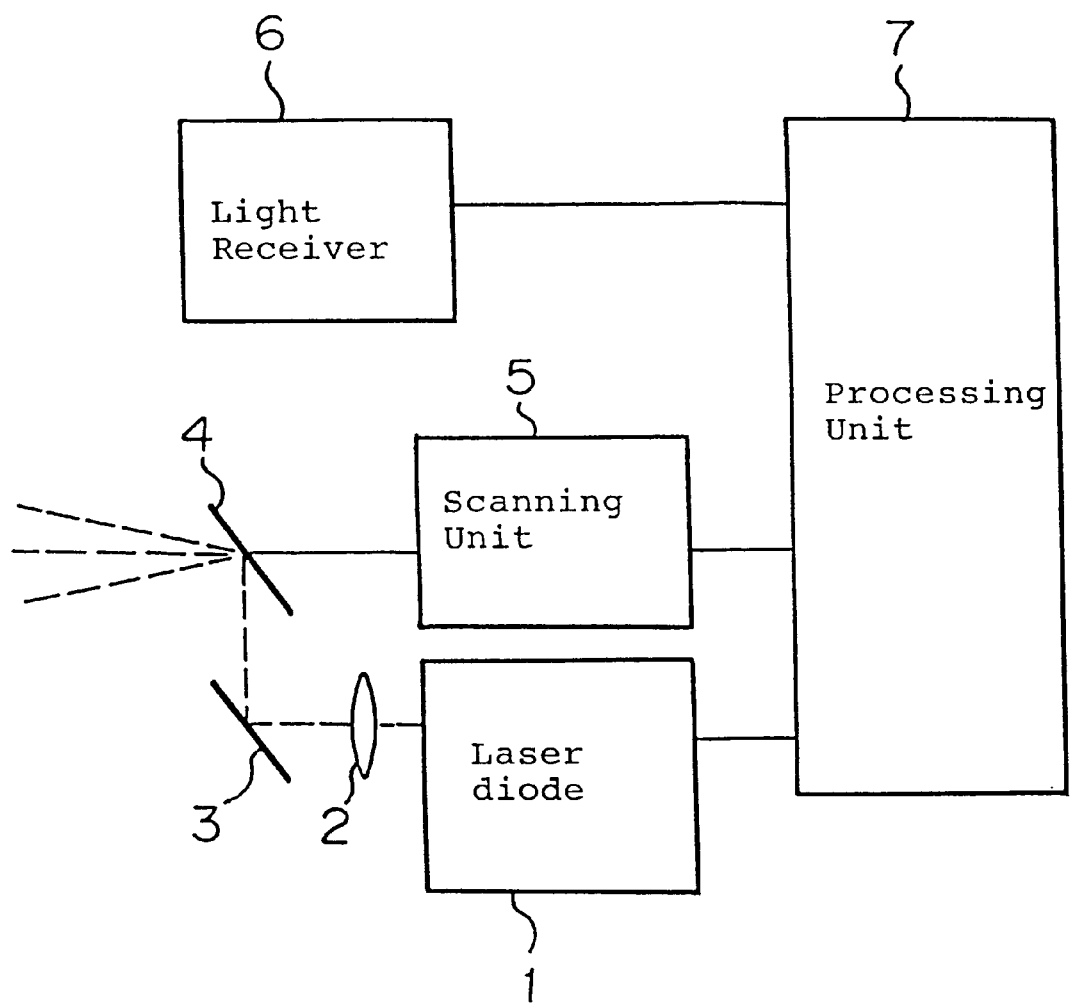
FIG. 1 is a block chart for illustrating a range finding device of a scanning type according to Embodiment 1 of the present invention.

FIG. 1 is a block chart illustrating the structure of range a finding device of a scanning type according to Embodiment 1 of the present invention. In FIGS. 1, numerical reference 1 designates a single laser diode being a single light source; numerical reference 2 designates a condensing lens for collecting pulses of light generated by the laser diode 1; numerical reference 3 designates a fixed mirror for reflecting beams converged by the condensing lens; numerical reference 4 designates a scanning mirror for further reflecting the beam reflected by the fixed mirror 3; numerical reference 5 designates a scanning device for scanning the laser beam by swinging the scanning mirror 4. Laser beams are emitted by a means composed of the laser diode 1, the condensing lens 2, the fixed mirror 3, the scanning mirror 4, and the scanning unit 5.

Numerical reference 6 designates a light receiver for receiving reflected pulses of light from the laser beams emitted as pulses from the laser diode 1 returned by reflecting off of an object (not shown) in scanning, and transforming these reflected beams to electric signals; and numerical reference 7 designates a processing unit for activating the laser diode 1 and the scanning unit 5, measuring a reciprocating time of the reflected pulses of light received by the receiving unit based on a time of emitting pulses by the laser diode 1, and calculating ranges in various directions. Ranges are measured by a means composed of the receiving unit 6 and the processing unit 7.

Figure 2:
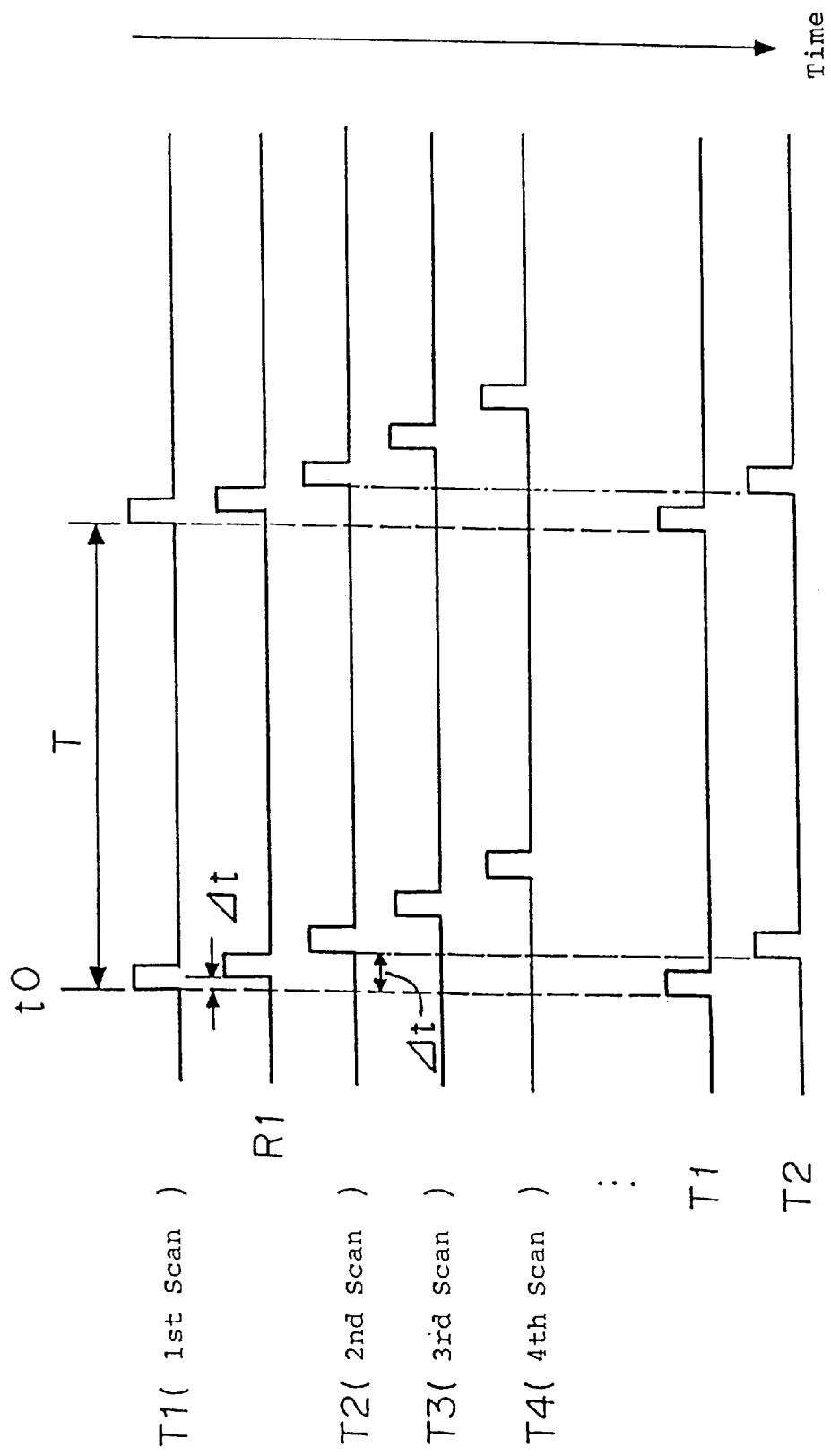
FIG. 2 is a timing chart of scans by the range finding device of a scanning type illustrated in FIG. 1.

An operation of the device will be described, for example, where the laser beam is scanned in horizontal directions. In FIG. 2, reference t0 is a reference point of scans, wherein an absolute angle at this point always has a same angle.

The processing unit 7 actuates the laser diode 1 for emitting pulses with a period T for making it emit the pulses having a very narrow time width of about 30 ns as showed in T1 of FIG. 2. The emitted pulse laser beam is then converged by the condensing lens 2. Thereafter, it is reflected by the fixed mirror 3 and further by the scanning mirror 4 being swung for scanning. The laser beam is reflected by an object and received in the light receiving unit 6 as reflected pulses of light. In FIG. 2, reference RI designates a receiving pulse wave form. The reflected pulses of light are subjected to a photoelectric transformation by the light receiving unit 6, and the transformed pulses are input into the processing unit 7. The processing unit 7 measures a time $\Delta t$ between the emission from the laser diode 1 and the receipt and input of the reflected pulses of light into the light receiving unit 6 and calculates a range from the object by multiplying a half of the measured time $\Delta t$ by a light velocity of $3 \times 10^8$ m/s.

The pulses are emitted such that a first beam is emitted and a second beam is succeedingly emitted after a time T. In the left diagram of FIG. 3, such succession is illustrated. Reference $\theta$ designates a beam interval representing an angle corresponding to the time T. This scan is referenced as the first scan.

Figure 3:
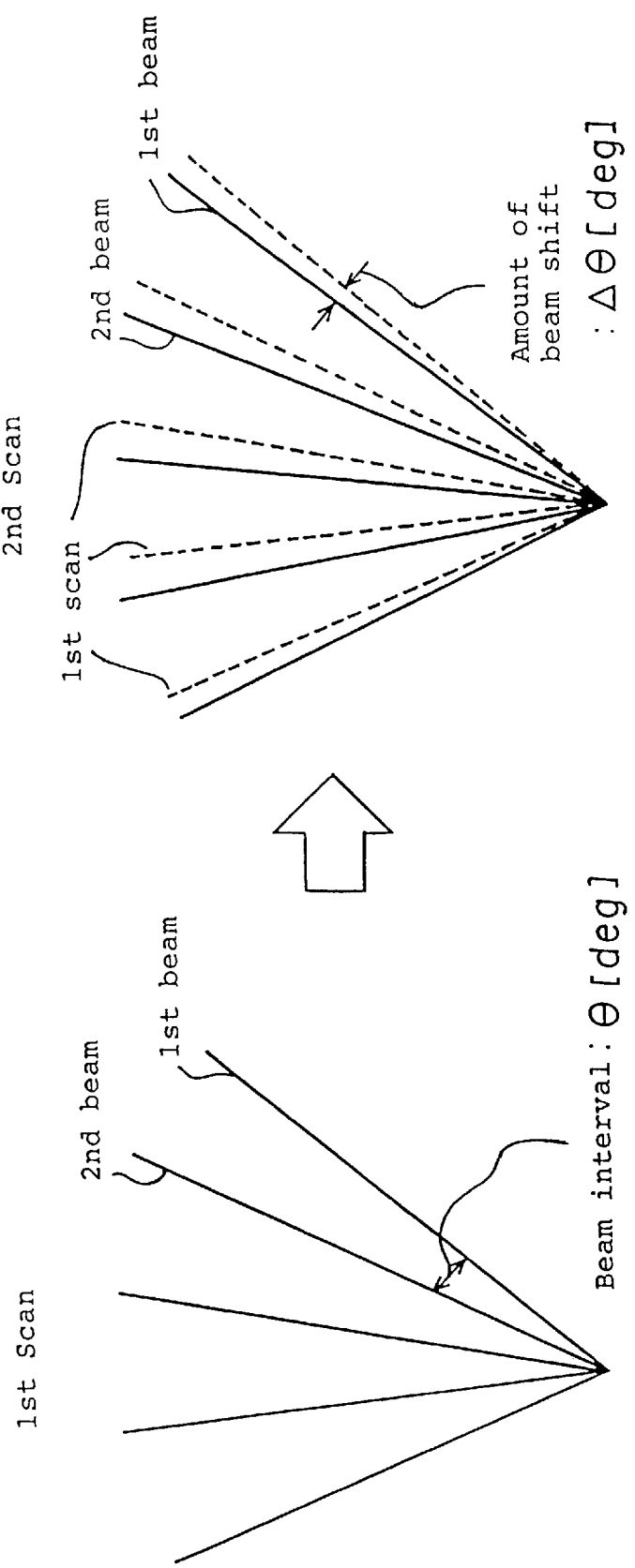
FIG. 3 schematically shows a relationship between beam intervals and the amount of beam shift of the range finding device of a scanning type illustrated in FIG. 1.

After finishing the first scan, the scanning unit 5 makes the scanning mirror 4 return to the reference position to start a second scan. In the second scan, pulses are emitted with a time lag $\Delta\tau$ from the point of emitting in the first scan T1 as in T2 of FIG. 2, whereby a range is calculated after finishing the range finding process as described above. By this time lag $\Delta\tau$ in emitting pulses, laser beams are shifted by an angle $\Delta\theta$, i.e. the amount of beam shift, as illustrated in FIG. 3. Thus, in the second scan the emitted light beams will be offset from the light beams of the first scan by an angle of $\Delta\theta$. By shifting beams for each scann so as to span the beam angle $\theta$, beams are irradiated in many directions. Dotted lines in the right of FIG. 3 represent the angles of the laser beams in the first scan.

Similarly, a third scan represented by T3 and a fourth scan represented by T4 are sequentially processed. After finishing a course of scans, the first scan is again performed to be succeedingly processed as above.

Figure 4:
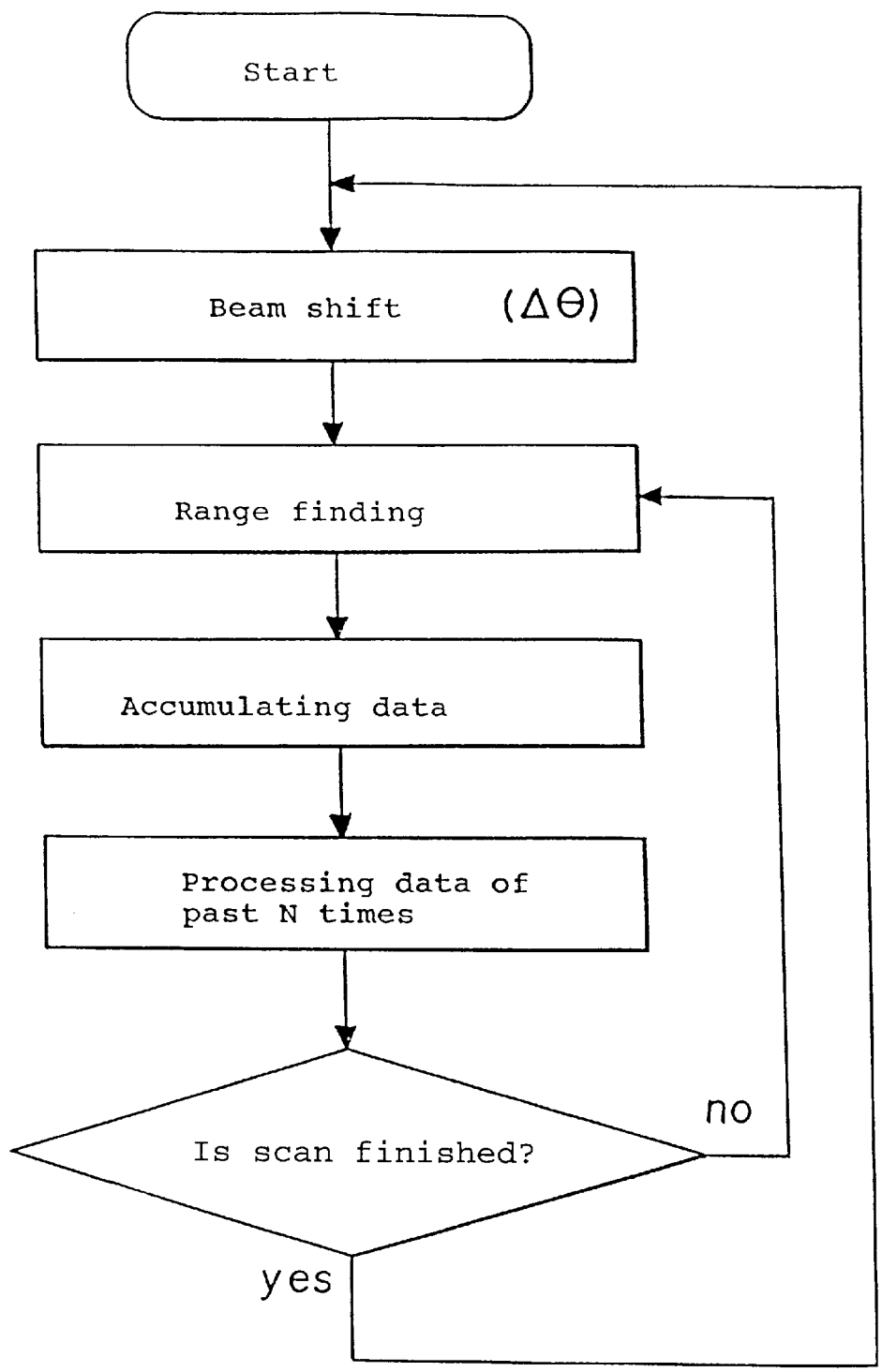
FIG. 4 is a flow chart for illustrating a method of processing by the range finding device illustrated in FIG. 1.

A method of processing by the processing unit 7 will now be described in reference to the flow chart of FIG. 4. In this case N scans are conducted. First, the amount of beam shift $\Delta\theta$ is set; then the laser beams are scanned to measure ranges for each laser beam; and the data is stored. Next, this is repeated for N subsequent scans where the scan angle is offset by $\Delta\theta$ from the previous scan, wherein the data from each of the N scan is processed and stored to judge the horizontal angle of an object. Reference N means is a value obtained by dividing the beam interval $\theta$ by the amount of the beam shifts $\Delta\theta$ and represents the number of dividing the beam interval. In other words, the amount of beam shifts $\Delta\theta$ is the amount obtained by equally dividing the beam interval $\theta$ into N.

Figure 5:
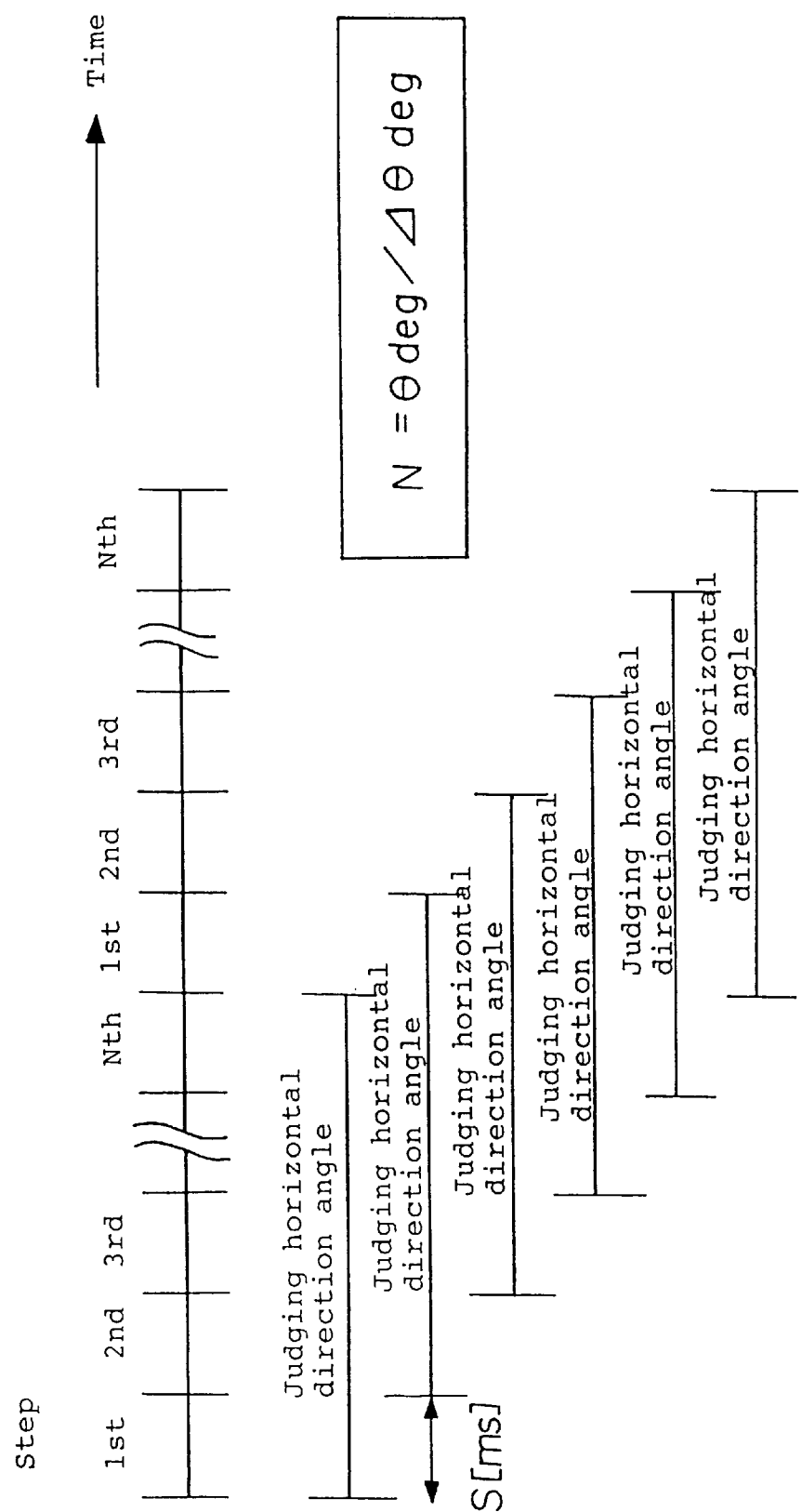
FIG. 5 is a chart for illustrating a flow of judging horizontal direction angles by the range finding device of a scanning type illustrated in FIG. 1.

In FIG. 5, a flow chart of the process for judging a horizontal direction angle by processing data of past N times is illustrated. The first step means is a reference angle of the beam shift; the second step means is an angle obtained by adding the amount of beam shift $\Delta\theta$ to the reference angle; and the third step means is an angle obtained by adding the amount of beam shift $\Delta\theta$ to that obtained in the second step. Thus, the word step means a measurement in each shifted angle. To put it more clearly, the angle $\Delta\theta$ between the first beam of the first scan and the first beam of the second scan corresponds to a "step". Therefore, the range that the first beams of each of N scans travels through (the total angle $\theta$) is broken into a number of steps, which correspond to the angle $\Delta\theta$ between the same beam of each subsequent scan.

Provided that the data of the first through Nth scans is the data of the immediately past N scans. The horizontal direction angle where the object exists is judged from this data. When the result of the next new first scan is acquired, the data of the new first scan is used instead of the data of the previous first scan. At this time, a horizontal direction angle is similarly judged from the data of the second through Nth scans and the new first scan, i.e. the immediately past, or most recent N scans. Accordingly, since data is output for each single scan, the period for judging and outputting the horizontal angle of an object is shortened and beams are irradiated in many directions. Further, a time lag in obtaining the result of judging the horizontal direction angle can be minimized while improving the measuring accuracy by utilizing the information of the immediately past N scans, which is the number of scans covering the beam interval $\theta$.

Figure 6:
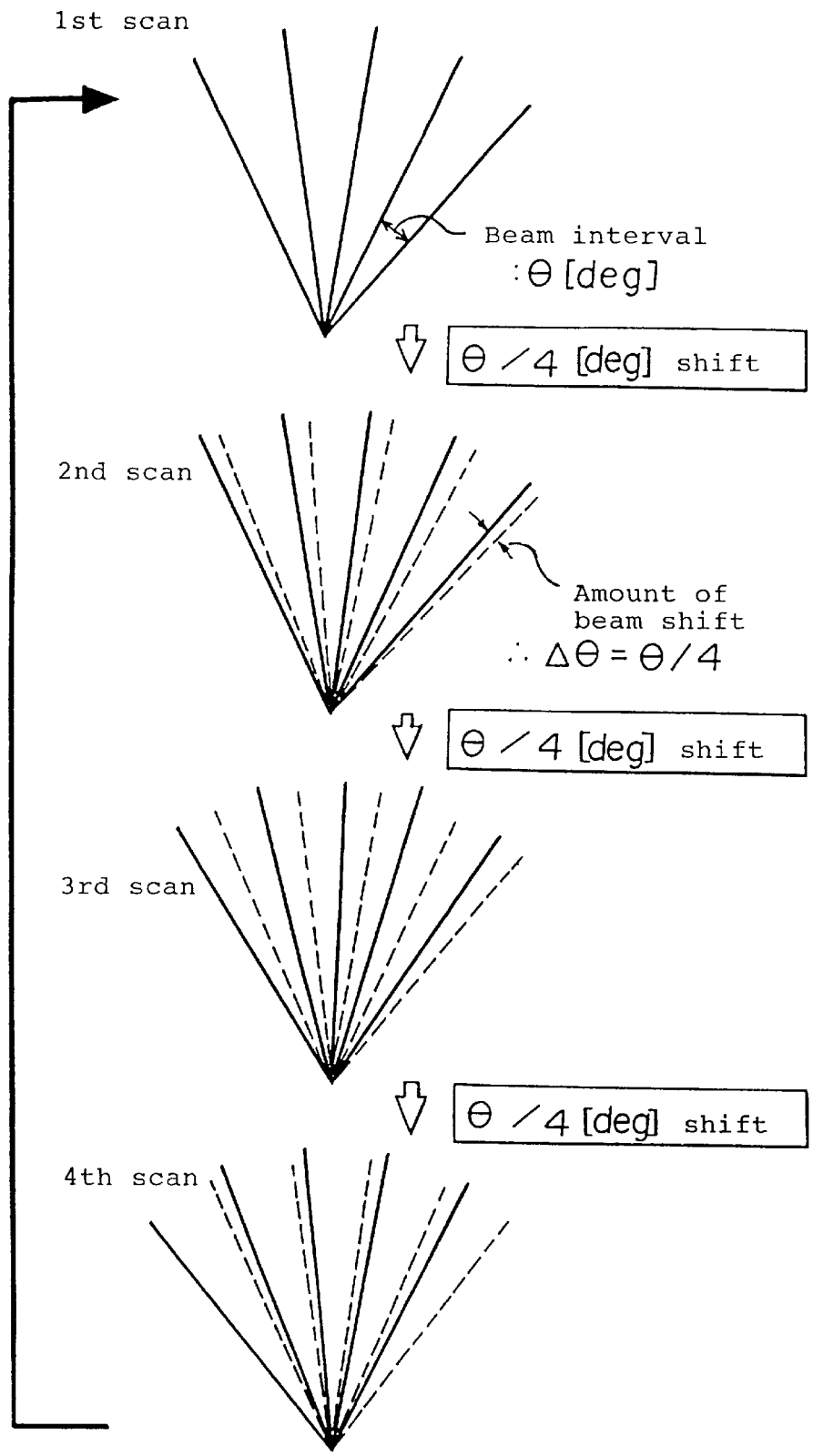
FIG. 6 illustrates how the beam shift is conducted in the range finding device of a scanning type illustrated in FIG. 1.
Figure 7:
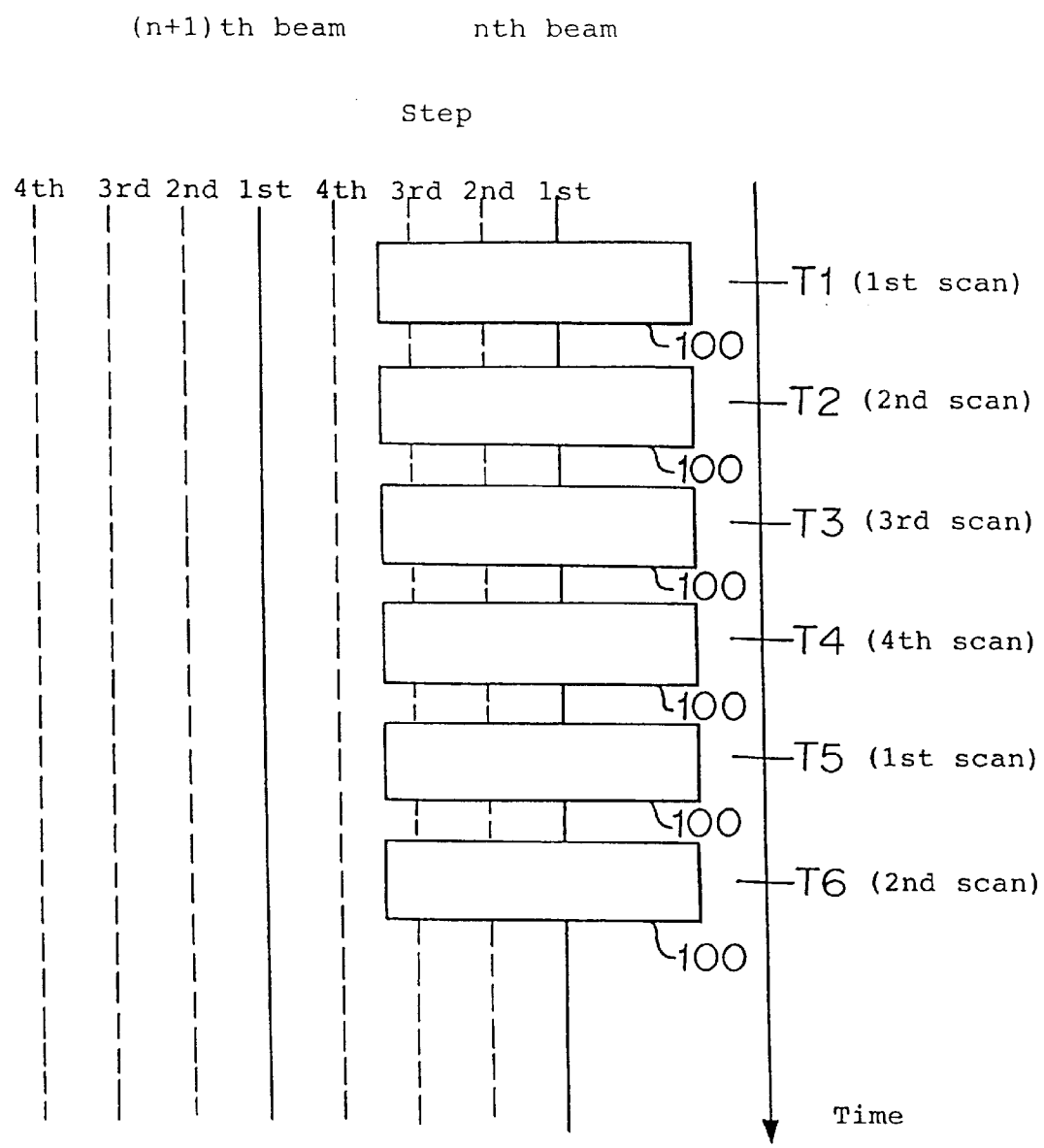
FIG. 7 is a chart for explaining an operation of the range finding device of scanning type using a position of an object.

A method of judging the horizontal direction angle of an object will now be described, in reference to FIGS. 6–8. FIG. 6 illustrates how the beams are shifted in a case when N=4. As illustrated, a shift of $\theta/4$ is effected to the beams for a first scan through a fourth scan. FIG. 7 illustrates the operation of the present invention in detecting the horizontal position of an object 100. In FIG. 7, numerical reference 100 designates the object being detected. When the left end of the object exists between an nth beam and a (n+1)th beam, (i.e., between the first and second beam of a single scan), detection or undetection of the object for each scan is as illustrated in FIG. 8. After finishing the sixth scan T6, of the nth and (n+1)th beams, detection or undetection of the past four times including this time is: detected in T3; undetected in T4; detected in T5; and detected in T6. Based on this information, it is known that a left end of the object is positioned at the third step in T6.

The method of judging the horizontal direction angle of an object in the case where N=4 is summarized in FIG. 9. When the object is detected only in the first step based on the information of the past four times, the horizontal direction angle of this time becomes $\delta$ where $\delta$ is the absolute angle of the first step of the nth beam. Further, in case that when the object is detected in the first and second steps, the horizontal direction angle at this time becomes $\delta+(\theta/4)$. Further, when the object is detected in the first, second, and third steps, the horizontal direction angle at this time becomes $\delta+(\theta/2)$. Further, when the object is detected in the first, second, third, and fourth steps and a previous position is $\delta+(\theta/2)$, the horizontal direction angle at this time becomes $\delta+(3\theta/4)$. Further, when the object is detected in the first, second, third, and fourth steps and a previous position is $\delta+(\theta/4)$, the horizontal direction angle at this time becomes $\delta$. Further, when the object is detected in the second, third, and fourth steps, the horizontal direction angle at this time becomes $\delta+(\theta/4)$ Further, when the object is detected in the third and fourth steps, the horizontal direction angle at this time becomes $\delta+(\theta/2)$. Further, when the object is detected in only the fourth step, the horizontal direction angle at this time becomes $\delta+(3\theta/4)$.

Although in the above-mentioned example, the laser beams are sequentially shifted in the same direction as that of the scan, the beams may be shifted, for example, in a direction adverse to that of the scanning or in a random manner.

The first advantage of the range finding device of scanning type according to the present invention is that a light emitting a system, namely the means for emitting laser beam, can be realized at a low cost using a single laser diode and ranges in many directions can be measured at a high rate.

The second advantage of the range finding device scanning type according to the present invention is that angular resolutions in horizontal directions can be improved.

The third advantage of the range finding device of scanning type of the present invention is that the accuracy of judging a relative position of an object and the accuracy of the relative velocity obtained from a change of ranges concerning the relative position with respect to a time are improved and therefore the capability of recognizing the object is improved.

The fourth advantage of the range finding device of scanning type according to the present invention is that the time lag for acquiring a result of judging the horizontal direction angle can be minimized because the most effective and minimum amount of past information is utilized.

Obviously, numerous modifications and variations of the present invention are possible in light of the above teachings. It is therefore to be understood that within the scope of the appended claims, the invention may be practiced otherwise than as specifically described herein.

What is claimed is:

1. A range finding device of a scanning type, comprising:

a beam emitting means using a single light source which conducts a series of scans, each scan being composed of a plurality of discrete laser pulses, and wherein a starting point of each one of the series of scans is angularly offset from a preceding scan; and a range finding means for detecting a range to an object from a time difference between an emission time and a time of receipt of a reflected pulse.

2. The range finding device according to claim 1, wherein the angular offset between scans is an angle determined by dividing an interval between said discrete laser pulses into equal parts.

3. The range finding device according to claim 1, wherein a direction angle of the object is judged from detected information obtained by said range finding means in a past plurality of scans.

4. The range finding device according to claim 2, wherein a direction angle of the object is judged from detected information obtained by said range finding means in a past plurality of scans.

5. The range finding device according to claim 3, wherein said past plurality of scans are the most recent scans which equal in number to the amount of scans contained in said series of scans.

6. The range finding device according to claim 4, wherein said past plurality of scans are the most recent scans which equal in number to the amount of scans contained in said series of scans.

\* \* \* \* \*